United States Patent Office 3,447,444
Patented June 3, 1969

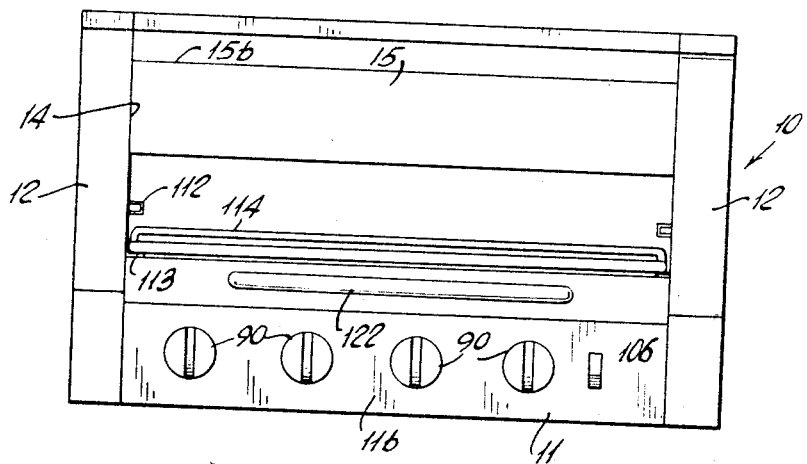
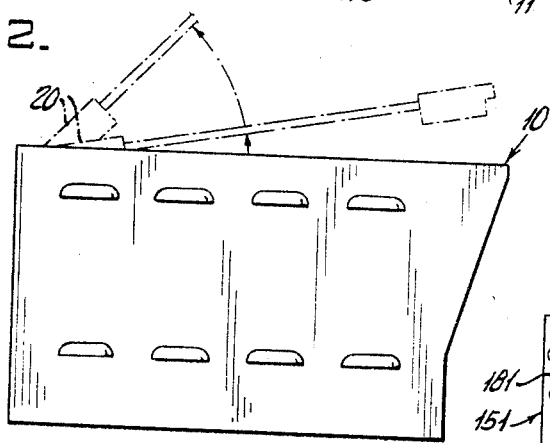
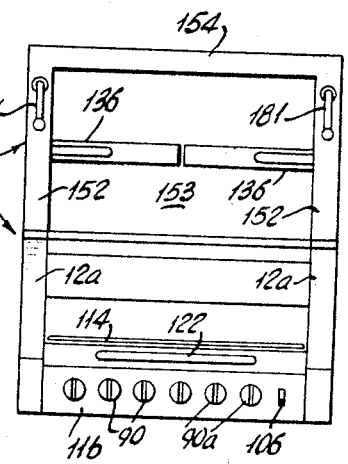
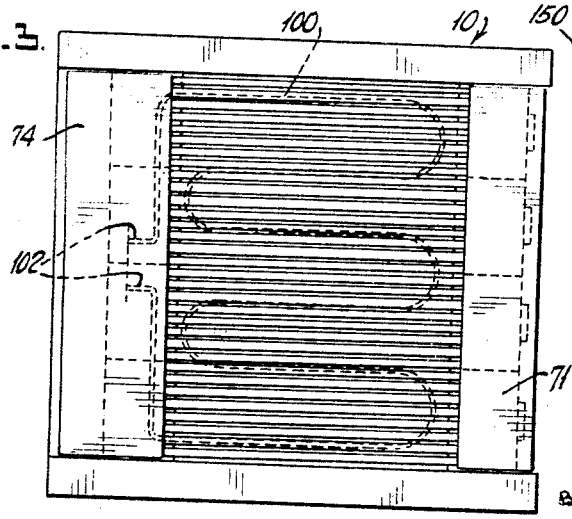

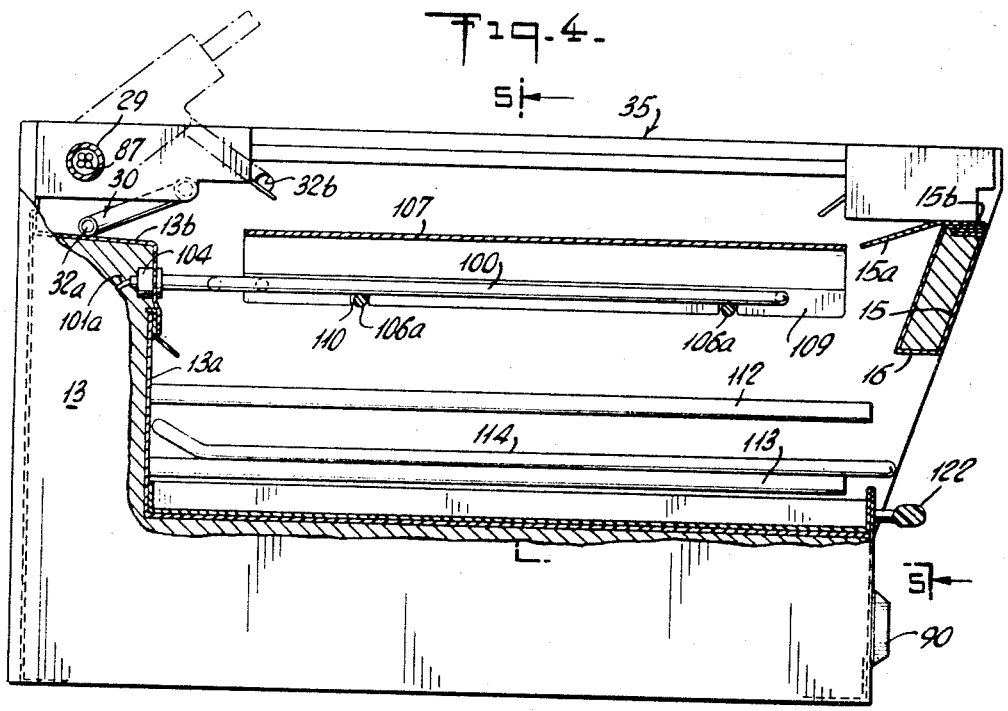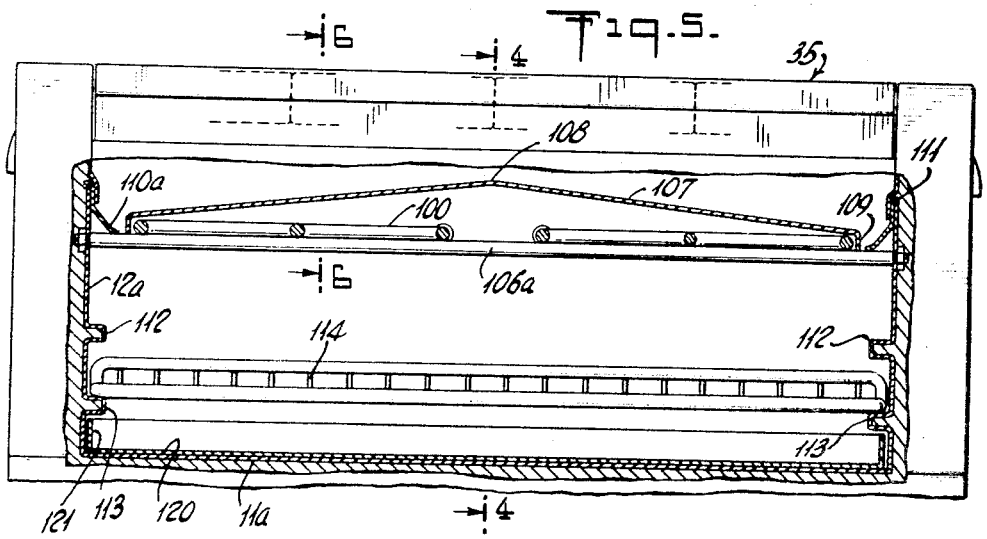

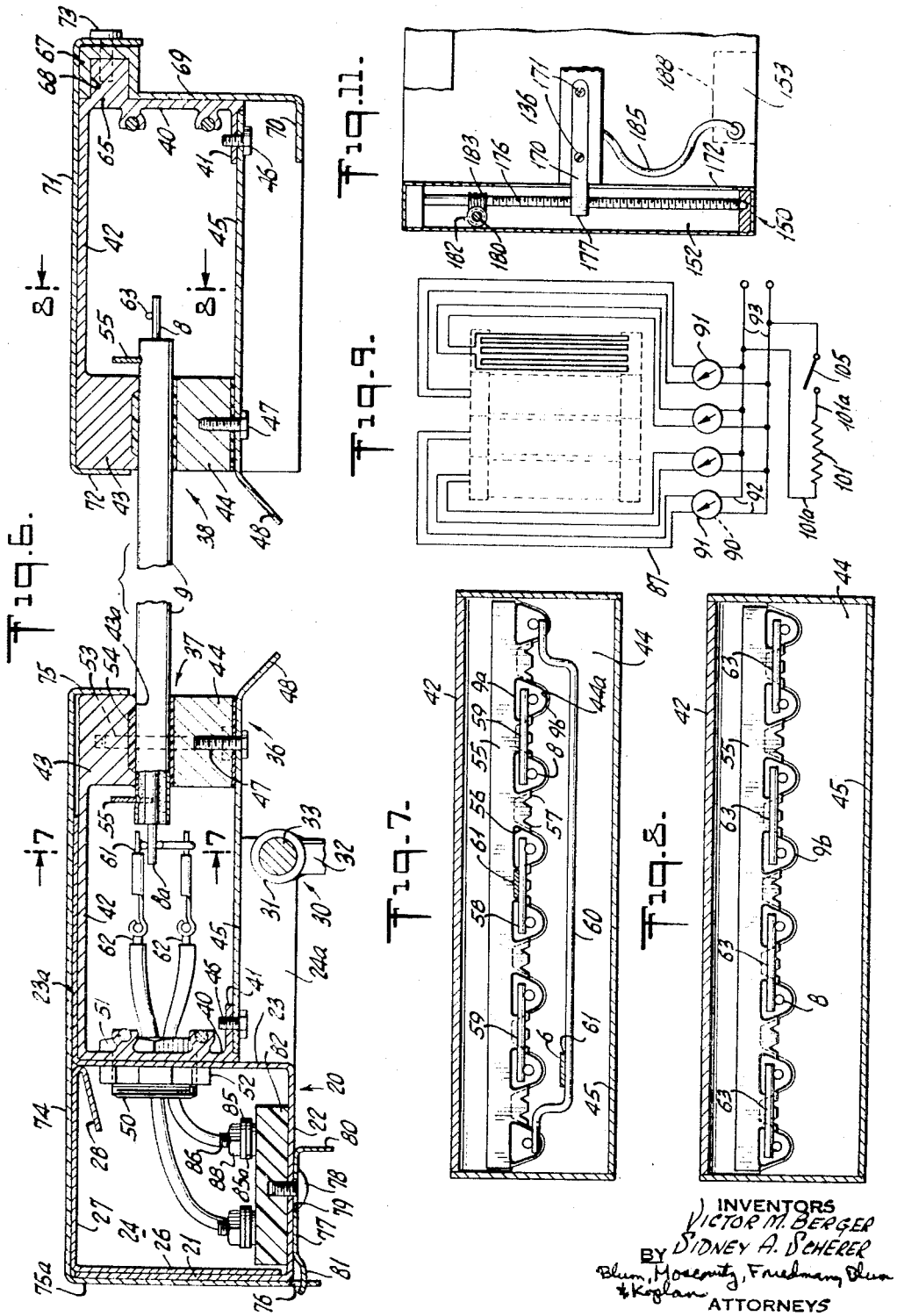

3,447,444
ELECTRIC COOKING APPARATUS
Victor M. Berger, Bayside, and Sidney A. Scherer, Bronx, N.Y., assignors to Electro-Char Corporation, New York, N.Y., a corporation of New York
Original application Nov. 30, 1964, Ser. No. 414,747, now Patent No. 3,350,543, dated Oct. 31, 1967. Divided and this application Aug. 1, 1967, Ser. No. 664,588
Int. Cl. F24c 7/06
U.S. Cl. 99—340     4 Claims

ABSTRACT OF THE DISCLOSURE

An electrified cooking apparatus which is open at the top and at the front with two electrified cooking grates which are mounted within the apparatus, with one located near the top and the other spaced below the one mounted near the top, with one of the electrified grates being movable toward or away from the other grate so that food placed on the lower grate can selectively be cooked by the upper and lower grates.

---

This is a division of application Ser. No. 414,747, filed Nov. 30, 1964, now Patent No. 3,350,543.

This invention relates to improvements in electric cooking apparatus and in particular relates to apparatus incorporating an electrified cooking grate of the type disclosed in prior U.S. patents to Savio, No. 2,938,102 and No. 3,022,410.

One object of the invention is to provide an electrified cooking grate which is easy to assembly and disassemble to facilitate repairs in the field.

Another object of this invention is to provide an improved electric cooking apparatus, incorporating an electrified cooking grate, in conjunction with auxiliary electric cooking devices, all cooperating to facilitate the use of the apparatus for a great variety of cooking purposes.

In the aforesaid U.S. Patent No. 2,938,102, there is disclosed an electrified cooking grate, the frame of which has a central opening with opposed end walls having a plurality of spaced apertures. A plurality of heating elements each comprising a generally straight metal tube, containing a wire, extend across the opening in spaced, generally parallel relationship with the ends of each tube respectively extending into end wall apertures and sealed therein against the passage of grease, liquids and the like. The upper surfaces of the tubes are generally coplanar to provide a cooking surface, the space between, immediately above and immediately below the tubes being unobstructed to permit placing food directly upon the cooking surface and to permit free flow of air around the tubes.

Customarily, the tubes of the electrified heating grate are divided into groups or sections, the electrical connections being such that each such group or section can be independently electrically controlled. Thus, in commercial apparatus, there may be, by way of example, four groups of heating tubes, with eight tubes in each group. Occasionally, the electric wire in one of the tubes may become burned out or may otherwise fail. In the past, this has necessitated disassembly of the electrified cooking grate and replacement of the single tube, a task frequently beyond the skill of the repairman in the field.

In accordance with the invention, the electrified grate is constructed so that each separately controlled group or set of heating elements can be separately removed and replaced as a unit, with a minimum of difficulty.

Another object of the invention is to provide a housing support and wiring raceways for the electrified cooking grate, such that on the one hand, the wiring is readily accessible for disconnection when a grate section is to be replaced, and on the other hand, the wiring is drawn through the housing to the bottom thereof, with the controls located at the bottom of the housing, this being the zone of minimum heat from the electrified cooking grate.

Other objects and advantages of the invention will become apparent from the following description, in conjunction with the annexed drawing in which preferred embodiments of the invention are disclosed.

In the drawing,

FIG. 1 is a front elevation of a broiler in accordance with a first embodiment of the invention.

FIG. 2 is a side elevation of the broiler of FIG. 1 showing the electrified grate in broken lines in two possible raised positions thereof.

FIG. 3 is a top plan view of the broiler.

FIG. 4 is a longitudinal section on line 4—4 of FIG. 1.

FIG. 5 is a transverse vertical section on line 5—5 of FIG. 4.

FIG. 6 is a fragmentary longitudinal vertical section, broken away, showing a removable section of the electrified cooking grate.

FIG. 7 is a section on line 7—7 of FIG. 6.

FIG. 8 is a section on line 8—8 of FIG. 6.

FIG. 9 is a schematic electric circuit diagram of the invention.

FIG. 10 is a somewhat diagrammatic front elevation of a second embodiment of the invention.

FIG. 11 is a fragmentary view similar to FIG. 10 but with certain parts broken away to show the internal construction.

Upon reference to the drawings in detail, and in particular to FIGS. 1–9 thereof, it will be seen that the drawing shows a casing 10 having hollow sidewall portions 12 with inner wall 12a, a hollow bottom casing wall portion 11 with upper wall 11a and rear hollow casing wall portion 13 with front wall 13a. The casing is generally rectangular, and the wall portions may have any suitable structure, such that the interior spaces of such wall portions meet each other. The walls 12a, 11a and 13a cooperate to form a well or recess 14. The upper wall 13b of the casing portion 13 is preferably located below the upper walls of the casing portions 12, as clearly shown in FIG. 4.

A rigidifying bar member 15 of any suitable construction is fixed to and extends between the walls 12a, at the front thereof, somewhat below the level of the upper walls of the casing portions 12, as shown in FIG. 4. This element 15 may have any suitable construction and is spaced above the recess floor 11a to define a front access opening 16 into recess 14. A splash guard 15a, which extends slightly downwardly and rearwardly from the top of the element 15, may be interfitted with the element 15 in any suitable way. The element 15, or more specifically the overlying guard portion 15b, serves as a seat for the front end of the pivotal electrified cooking grate.

The rear end of the electrified cooking grate is supported by a laterally extending hollow casing 20 which is in turn pivotally connected to the casing sidewall portions 12. Casing 20 may be fabricated in any suitable way to have a generally rectangular shape. As shown, the casing 20 is formed from sheet metal which is cut and bent to form a vertical rear wall 21, bottom wall 22 and front wall 23. The upper end of the front wall 23 connects with a forwardly extending horizontal panel 23a. Any suitable sidewalls 24 may be provided, by any suitable means, to close the ends of the casing 20. The interior space of the casing 20 serves as a wiring raceway and junction box, which is closed by a removable cover 27. In the illustrated construction, the cover 27 connects at its rear edge with a vertical panel 26 which bears frictionally flush against wall 21, and the front edge of cover 27 extends frictionally against the wall 23 and further connects with a downwardly rearwardly extending flange 28.

Any suitable hollow pivot tube 29 is connected to each wall 24 and further extends turnably through any suitable opening in a wall 12a, the construction being such that the bore of tube 29 provides communication between the interior space of casing 20 and the interior space of casing wall portion 12.

Each wall 24 has a vertical extension 24a extending forwardly of casing 20. A rod 33 is fixedly connected between the extensions 24a, at the front lower corners thereof. A pair of hook members 30 are provided, each having a sleeve 31 slidably and turnably mounted upon rod 33. A rod 32 is fixed to sleeve 31 and extends transversely thereto. The outer end of rod 32 is ben outwardly to form a lateral arm 32a. When the casing 20 is pivoted to an intermediate position (the broken line position of FIG. 4 and the lowermost broken line position of FIG. 2), the sleeves 31 may be slid outwardly on rod 33 and may be turned so as to bring the rod portions 32a through holes 32b formed in the respective walls 12a forwardly of the pivot 29, thereby releasably locking the casing 20 in such intermediate elevated position, and thereby facilitating access to the recess 14 under the electrified grate, for cleaning and servicing purposes.

The electrified cooking grate 35 comprises a plurality of sections 36, each such section comprising a rear casing 37 releasably fixed to wall 23 of casing 20, a front casing section 30 and heating tube elements 9 extending between and connected to the casing sections 37 and 38.

The casing sections 37 and 38 are of quite similar construction, and are in turn somewhat similar to the structures shown in the aforesaid prior patent to Savio, #3,022,410.

The casing 36 includes an extrusion shaped to provide a rear wall 40, top wall 42 and front boss 43, of increased thickness, depending from wall 42. In addition, a horizontal flange 41 extends forwardly from wall 40 adjacent the bottom thereof. A bottom plate 45 is fixed to flange 41 by means of screws 46. A boss 44 is fixed to the upper face of plate 45 adjacent the front thereof, by means of screws 47 in opposition to boss 43 and cooperating therewith to define a front casing wall with apertures for reception of the tubes 9. Forwardly of such front wall, the plate 45 is extended downwardly forwardly to define a guard 48.

The casing 36 is fixed to wall 23 by conventional fittings commonly used with junction boxes. Specifically, a hollow screw-threaded shank 50 having a nut head 51 is extended through respective openings in walls 40 and 23 with head 51 against wall 40. Within the raceway of casing 20, a nut 52 is screwed onto the screw-threaded shank 50 and against the wall 23. The structure is such that a plurality of boxes or casings 36 may be mounted upon casing 20 with the sides of the boxes or casings 36 in substantial abutment, four such casings being shown mounted in the drawing. The outer sides of the outermost boxes 36 are substantially aligned with the sides of casing 20.

Each tube element 9 is hollow and has a flat upper surface 9a joined at its sides with a convex wall 9b. A heating wire 8 extends through the interior of the hollow tube 9. This element is conventional and reference is made to the aforesaid patents and to known practice to complete the disclosures thereof.

The element 44 has a series of notches 44a in its upper surface, these notches 44a having substantially the same contour as the tube wall 9b. The flat bottom surface of the element 43 has a pair of depending lateral ribs 43a. A plurality of tubes 9, 8 being illustratively shown in the drawing, are located in a corresponding number of notches 44a, with the element 43 overriding the tops of the tubes and clamped to the element 44 by means of a plurality of screws 53. The ribs 43a dig into the tube surface to insure good electrical contact between the casing and the tubes. The apertures in the wall 43, 44 through which the tubes 9 extend is sealed by a sealing compound 54. Reference is made to the aforesaid Patent No. 3,022,410 to complete the disclosure in this regard.

The tubes 9 extend into the interior space of the casing. In order further to unite the casings of the tubes 9 electrically, a laterally and vertically extending bar 55 is fixed to the tubes 9 in the interior of the casing 36. Specifically, such bar 55 has notches 56 in its lower edge, into which the tubes 9 are forced. Intermediate the notches 56, the lower part of the bar 55 is sawtoothed so as to provide teeth 57 on each side of the notch 56 which engage frictionally against the tube wall 9b.

The wires 8 within the tubes extend rearwardly thereof at 8a for the purpose of electrical connections. Specifically, the two middle wires 8 are connected by bus 58, and the next two wires on each side are connected to each other in each instance by a bus wire 59. The extreme end wires 8 are connected by a bus wire 60. Wires 61 are respectively connected to bus 58 and to bus 60 and are in turn connected to wires 62 which are extended through the bore of element 50 and hence into the raceway of housing 20.

The front box 38 is quite similar to the rear box 37, with like parts designated by like reference characters, so that complete description is not necessary. Of course, it will be understood that the orientation of the parts is reversed front to rear, as clearly shown in FIG. 6.

Within the interior of the box 38, the wires 8 are connected by a series of bus wires 63. As shown in FIG. 9, there are four such bus wires 63 respectively connecting the two outermost wires 8 and the two intermediate pairs of wires 8. Thus, it will be seen that the heating elements are connected in two series of four each with the two series in turn connected in parallel. However, it is obvious that any suitable wiring arrangement can be employed, that shown in the drawing being purely illustrative.

In order to secure the front boxes 38 together as a rigid unit, each of the walls 40 thereof is formed with a lateral boss or tongue 65 near the top thereof. The tongues 65 of the four boxes 38 are laterally aligned. A laterally extending channel member 67 has a groove 68 which frictionally receives the four tongues 65. The channel 67 has at its bottom rear edge a downward extension 69 which abuts wall 40 and which connects at its lower end with a rearwardly extending flange 70 which underlies and abuts wall 45.

The assembly of the electrified grate 36 may be completed by any suitable trim. In the case of the front boxes 48, the trim may comprise a flat plate 71 which overlies the four boxes and which has a depending peripheral flange 72 which abuts the rear wall 44 of the four boxes, the sides of the outermost boxes and the front of the channel 67. At the front, the flange 72 may be secured by screws 73 to the front of channel 67.

At the rear, a plate 74 may overlie the tops of the four boxes 37 as well as the top of the housing 20. Such plate 74 may have a depending edge flange 75 which abuts the fronts of the elements 43, above tubes 49, and which also abuts the sides of the outermost boxes 37. At the rear, plate 74 connects with a depending vertical panel 73a which abuts the rear of housing 20 and which extends below the bottom housing all 22, where it is provided with slots 76. Clips 77 are slidably secured to the bottom of wall 22 by means of respective screws 78 extended through longitudinally extending slots 79 in the clips 77. The front end of each clip 77 is extended downwardly at 80 for finger gripping, and the rear end of clip 77 is formed into a tongue 81 which extends into a notch 76, in the position shown in FIG. 6. It will be apparent that for release of the trim plate 74, the screw 78 may be loosened and the clip 77 moved forwardly by gripping of its flange 80, so as to draw the tongue 81 out of slot 76.

From the foregoing, it will be seen that we have provided a composite electrified grate structure 35 which may be used for cooking purposes entirely similarly to the structures of the aforesaid previous Patents #2,938,102 and #3,022,410. Further, the grate can be readily swung out of cooking position, in which its upper surface is horizontal and at the level of the top of the recess 14, to an upwardly tilted position for cleaning and servicing purposes. Furthermore, the electrified grate has four sections 36, each individually fabricated by means somewhat as shown in the aforesaid Patent No. 3,022,410, and each independently mounted to the raceway housing 20. Accordingly, if any one of the separately controlled sections 36 becomes inoperative, as by opening of one of the wires therein, it is possible simply to remove the raceway cover, disconnect the two wires of the damaged section, remove the nut 52 and replace the damaged section. Obviously, the removal of the trim to reach the damaged section for repair and replacement is a simple matter.

As a further feature of the invention, the electrical controls are located in the bottom casing section 11. To achieve this, a junction block 82 is fixed to the housing bottom wall 22 bymeans of the aforesaid screws 78. The wires 62 are provided at their ends with conventional fittings 85 which are extended upon conventional binding posts 86 on the upper surface of block 82, with the clips 85a of additional wires also secured to the posts 86, by means of nuts 88. The wires 87 associated with such clips 85a are further drawn through the main housing 10. Thus, when a grating section is damaged and it is to be replaced, it is only necessary to remove the nuts from two binding posts in order to detach the wires 62 associated with such damaged section, which wires can then be drawn through the bore of the fitting 50. As shown somewhat diagrammatically in FIG.. 4, the two wires 87 of each of the sections on each side may be drawn through the fitting 29 and hence into the casing sides 12, from which the wires can extend to the bottom section 11. The physical arrangement of the wires and of the controls within the section 11 is not shown since this is conventional and the existence thereof will be obvious from the showing that is made. Specifically, FIG. 1 shows control knobs 90 mounted upon the front panel 11b of the casing section 11. As shown diagrammatically in FIG. 9, these knobs 90 control conventional infinite controls 91 which are interposed in the respective pairs of lines 87. Each control 91 connects a pair of lines 87 to a further pair of lines 92, which are all connected in parallel with the main lines 93 which are in turn connected to any suitable source of power, not shown. By way of example, in the wiring diagram shown, the source of power can be single phase 208 volt alternating current. However, as indicated above, any other suitable wiring arrangement can be employed.

In the electric cooking apparatus of the aforesaid Patents #2,938,102 and #3,022,410, it was not possible to make any cooking use of the space below the electrified grate. As a particular feature of this invention, a conventional broiling element is located below the electrified grate 35, and structure is provided so as to protect such further cooking element from the hot grease and oil which may drip downwardly from the electrified grate. The additional heating element is in the form of a serpentine horizontal tube 100 which may have any suitable configuration such as the configuration shown in FIG. 3. This tube 100 contains a conventional heating wire 101. At the rear, the tube 100 is shaped to provide parallel longitudinal legs 102 which are extended through wall 13a and are secured thereto by any suitable fittings 104. The wire 101 is represented electrically as a resistance in FIG. 9. The leads from the resistance wire 101, designated by the referance character 101a, are connected respectively to the lines 93, one of the leads 101a being connected through a snap-action lever switch 105, the operating lever of which is shown at 106 on the panel 11b, in FIG. 1.

The tube 100 is further supported by a pair of lateral rods 106a which extend across the recess 14 and are fixed to the respective sidewalls 12a. It will be noted that the element 100 is in longitudinal opposition to the frame element 15, so as to minimize the risk of touching the hot tube 100 when food is being brought into or out of the recess 14 through the access opening 16. The two rods 106 serve the further function of supporting a protective shield plate 107 which is located above the tube 100 and below the tubes 9. This plate 107 is slightly downwardly outwardly inclined on each side of its longitudinal center line 108. At its sides, the plate 107 is provided with depending flanges 109 having bottom notches 110 which receive the rods 106 for support of the flanges 109, the plate 107 being thereby spaced above the hot tubular heating element 100. It will be apparent that any greaes from the tubes 9 strikes the inclined portions of the plate 107 and drips down on the outer sides of the flanges 109 to the cool zone below the tube 10. Additional guard elements in the form of longitudinally extending, downwardly inwardly inclined plates 110a are releasably secured to the walls 12a adjacent the flanges 109. Specifically, the wall 12a is provided in each instance with a slot, with the guard 110a having an extension 111 which may be hooked into the slot.

Below the tubular heating element 100, the respective walls 12a are formed with inwardly extending ribs 112 and 113, respectively, with the ribs 112 at one level and the ribs 113 at a lower level serving as respective tracks for reception of a conventional openwork grate unit 114 which may thereby be slid into and out of the recess 14 through the access opening 16. At the very bottom, resting upon wall 11a and below the bottom pair of ribs 13, we provide a tray 120 which is slidable upon the wall 11a and which has an upstanding peripheral flange 121. The tray is coextensive in area to the base of the recess 14 and is provided with a front handle 122 whereby it may be slid into and out of the secess 14 through the acess opening 16.

From the foregoing, it will be apparent that while food is being cooked directly upon the upper surface of the electrified grate 35, additional food can be conventionally cooked by means of the heating element 100, with the tube 100 being shielded in accordance with the structure described above.

In certain instances, it is desirable to speed up the cooking of food upon the upper surface of grate 35, by means of overhead broiling, and in some instances it is desirable to provide a complete cooking unit having facilities for cooking foods by broiling or the like. This is accomplished in accordance with the embodiment of the invention shown in FIGS. 10 and 11. In this embodiment, the lower unit 150 is substantially the same as in the first embodiment, except for the provision of additional controls for the added overhead unit 151. This overhead unit 151 has vertical hollow sidewalls 152 which rest upon the tops of the casing wall portions 12a. These walls 152 are connected by a rear wall 153 and also by a top horizontal strut 154. However, the top of the unit 151 is generally open to permit the escape of heat and steam from the electrified grate 35. A pair of units 136 are disposed within the interior space of the unit 151, these units 136 optionally corresponding substantially to the sectional units 36 of the first embodiment. Each such unit 136 is located adjacent a respective side 152 of the unit 151 and is preferably arranged so as to be vertically adjustable. Instead of a front rib, as shown in connection with the unit 36, the grate section 136 is provided at its front with a laterally extending bar 170, secured thereto by screws 171. A similar bar, not shown, is affixed to the rear of the unit 136. The bar 170 extends outwardly of the unit 136 and extends through an elongated vertical slot 172 formed in the wall 152. A pair of vertically extending shafts 175 are journalled in the interior of the wall 152, only the front such shaft being shown. The shaft 175 is provided, opposite the slot 172, with a screw thread 176. The outer end of the bar 170 is formed into a nut portion 177, which is threadedly received upon the screw 176. With a similar structure at the rear (not shown), it will be apparent that by turning of the two screws, the unit 136 may be raised or lowered. Any suitable means may be provided to turn the screws 176. Thus, as illustratively shown in the drawing, a horizontal crank shaft 180 is journalled in wall 152, having a handle 181 outside the front of the wall 152. This crank shaft 180 has mounted thereon a worm gear 182 which meshes with a worm pinion 183 mounted upon shaft 175 above the screw thread 176. Accordingly, by turning the crank handle 181, the unit 136 can be raised and lowered. The construction on only one side is shown, since it will be apparent that the construction on the other side can be the same. On each side, the two wires from the rear of the unit 136 are drawn outwardly thereof in a cable 185 of sufficient length to accommodate the full upward position of the unit 136. This cable 185 is drawn to the bottom of the unit 150 and is extended outwardly through hole 186 in the rear wall 153 into any suitable junction box 188 mounted upon the rear of wall 153. Although not shown, it will be apparent that additional wiring may be connected within the junction box to the cable 185 and hence carried into the rear casing portion 13 and hence to the control panel 11b. Thus, FIG. 10 shows additional control knobs 90a on the control panel 11b, which may be connected in circuit with the operative electric elements of the two units 136, similarly to the wiring arrangement shown diagrammatically in FIG. 9.

In the raised position of the two units 136, they may be used for overhead broiling of food placed upon the electrified grate 35. In the lowered position of the units 136, they may be used, for example, to boil or otherwise cook food in pots placed upon the upper surfaces of the tubes of such elements 136.

Thus, it will be seen that we have shown a single unit which may be utilized for both direct and overhead broiling purposes, together with boiling or other conventional cooking of foods. In other words, in a single compact unit, all cooking functions other than baking and roasting can be performed in a minimum of space.

We claim:

1. Electrified cooking apparatus comprising a housing having a bottom wall, side walls and a rear wall defining a recess opening to the top thereof and having a front access opening, a first electrified cooking grate, means mounting said first electrified cooking grate in said housing intermediate the top and bottom of said recess, the space immediately above and immediately below said first electrified cooking grate being unobstructed to permit placing food directly upon said first electrified cooking grate and to permit free flow of air around said first electrified cooking grate, a second electrified cooking grate, means mounting said second electrified cooking grate on said housing within said recess and above said first electrified cooking grate, and means cooperating with the means mounting one of said electrified cooking grates for moving at least one of said electrified cooking grates toward and from the other of said electrified cooking grates so that said grates may be positioned relatively close to one another for reception of food directly upon said second electrified cooking grate and may be positioned relatively remote from one another whereby food placed upon said first electrified cooking grate for cooking can be broiled from above by said second electrified cooking grate.

2. An electrified cooking apparatus as claimed in claim 1 wherein said first electrified cooking grate comprises a plurality of straight hollow metal tubes each containing a wire, and means clamping the ends of said tubes, said tubes extending across said recess in spaced, generally parallel relationship, the upper surface of said tubes being generally coplanar to provide a cooking surface.

3. An electrified cooking apparatus as claimed in claim 1 wherein said means for movably mounting one of said electrified cooking grates cooperates with the means for mounting said second electrified cooking grate, whereby the position of said second electrified cooking grate is movable between a position relatively close to said first electrified cooking grate and a position relatively remote from said first electrified cooking grate, at which time food placed on said first electrified cooking grate can be broiled from above by said second electrified cooking grate.

4. An electrified cooking apparatus as claimed in claim 1 and including means for controlling the electrical input to said first and second electrified cooking grates for individual selection of the heating of said first and second electrified cooking grates, whereby said first and second electrified cooking grates may be heated at the same time to provide for the cooking from below and above of food placed on said first electrified cooking grate.

References Cited

UNITED STATES PATENTS

| | | | |
|---|---|---|---|
| 2,156,216 | 4/1939 | Russell et al. | 219—455 XR |
| 2,290,658 | 7/1942 | Volks | 99—446 |
| 2,852,654 | 9/1958 | Magin | 99—446 XR |
| 2,856,502 | 10/1958 | Wolf | 99—446 XR |
| 2,905,077 | 9/1959 | Del Francia | 99—446 |
| 2,938,102 | 5/1960 | Savio | 99—446 XR |
| 3,023,298 | 2/1962 | Wells | 219—445 |
| 3,166,006 | 1/1965 | Lennox | 99—446 |
| 3,225,682 | 12/1965 | Savio | 99—446 |
| 3,252,407 | 5/1966 | Buerki | 99—446 |
| 3,301,170 | 1/1967 | Beasley | 99—446 XR |

WALTER A. SCHEEL, *Primary Examiner.*

JOHN M. NEARY, *Assistant Examiner.*

U.S. Cl. X.R.

99—339, 446, 448